США010067153B2

United States Patent
Kasuya

(10) Patent No.: US 10,067,153 B2
(45) Date of Patent: Sep. 4, 2018

(54) SEMICONDUCTOR DEVICE, ELECTRONIC CONTROL SYSTEM, AND AUTOMOBILE

(71) Applicant: Renesas Electronics Corporation, Tokyo (JP)

(72) Inventor: Nobufumi Kasuya, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 144 days.

(21) Appl. No.: 15/137,216

(22) Filed: Apr. 25, 2016

(65) Prior Publication Data

US 2017/0115318 A1 Apr. 27, 2017

(30) Foreign Application Priority Data

Oct. 26, 2015 (JP) .................... 2015-209769

(51) Int. Cl.
| | |
|---|---|
| *G01P 1/00* | (2006.01) |
| *G01C 19/5776* | (2012.01) |
| *B60R 21/01* | (2006.01) |
| *G01P 15/00* | (2006.01) |
| *G01C 19/5607* | (2012.01) |
| *G01P 15/12* | (2006.01) |
| *G01P 15/125* | (2006.01) |

(52) U.S. Cl.
CPC .............. *G01P 1/006* (2013.01); *B60R 21/01* (2013.01); *G01C 19/5607* (2013.01); *G01P 15/00* (2013.01); *G01P 15/123* (2013.01); *G01P 15/125* (2013.01)

(58) Field of Classification Search
CPC ............................ G01P 1/006; G01C 19/5776
See application file for complete search history.

(56) References Cited

U.S. PATENT DOCUMENTS

2005/0183501 A1* 8/2005 Saito ...................... G01C 21/16
73/497

FOREIGN PATENT DOCUMENTS

| JP | 10-009036 A | 1/1998 |
| JP | 2012-169715 A | 9/2012 |

* cited by examiner

*Primary Examiner* — John Chapman, Jr.
(74) *Attorney, Agent, or Firm* — Mattingly & Malur, PC

(57) ABSTRACT

A semiconductor device according to the present invention includes plural temperature sensors; a switching circuit that switches between detection signals from the temperature sensors at a predetermined frequency; an ADC that receives the output of the switching circuit and outputs a converted signal; a correction information extracting circuit that generates a temperature mean value; and an abnormality information extracting circuit that generates a temperature difference value.

18 Claims, 14 Drawing Sheets

SEMICONDUCTOR DEVICE, ELECTRONIC CONTROL SYSTEM, AND AUTOMOBILE

CROSS-REFERENCE TO RELATED APPLICATIONS

The disclosure of Japanese Patent Application No. 2015-209769 filed on Oct. 26, 2015 including the specification, drawings and abstract is incorporated herein by reference in its entirety.

The present invention relates to a semiconductor device, an electronic control system, and an automobile, and concerns, for example, a semiconductor device having a sensor with redundancy, an electronic control system, and an automobile.

BACKGROUND

An automobile includes an angular velocity sensor that detects an angular velocity, an acceleration sensor that detects an acceleration, and an electronic control unit (ECU) that controls an engine to prevent a sideslip of the automobile and controls airbag activation based on the detection results of the sensors.

In recent years, the need for safety of automobile functions has intensified and thus higher accuracy has been demanded of angular velocity sensors and the acceleration sensors, accordingly. In this case, an angular velocity sensor and an acceleration sensor have temperature characteristics that are corrected by temperature sensors. This requires a system for detecting failure of the temperature sensors. Techniques for detecting failures of sensors are disclosed in, for example, Japanese Unexamined Patent Application Publication No. 10-9036 and Japanese Unexamined Patent Application Publication No. 2012-169715.

SUMMARY

However, the technique of Japanese Unexamined Patent Application Publication No. 10-9036 may lead to a large area and the technique of Japanese Unexamined Patent Application Publication No. 2012-169715 may cause insufficiently accurate temperature data used for temperature corrections. Other problems and new features may become apparent from a description of the present specification and the accompanying drawings.

According to an embodiment, a semiconductor device extracts frequency components for correcting an output signal from an external sensor and frequency components for detecting abnormalities of internal sensors, from consecutive data that is inputted while the outputs of internal sensors are periodically switched.

The embodiment can improve the accuracy of failure detection of sensors having redundancy.

DETAILED DESCRIPTION

Figure 1:
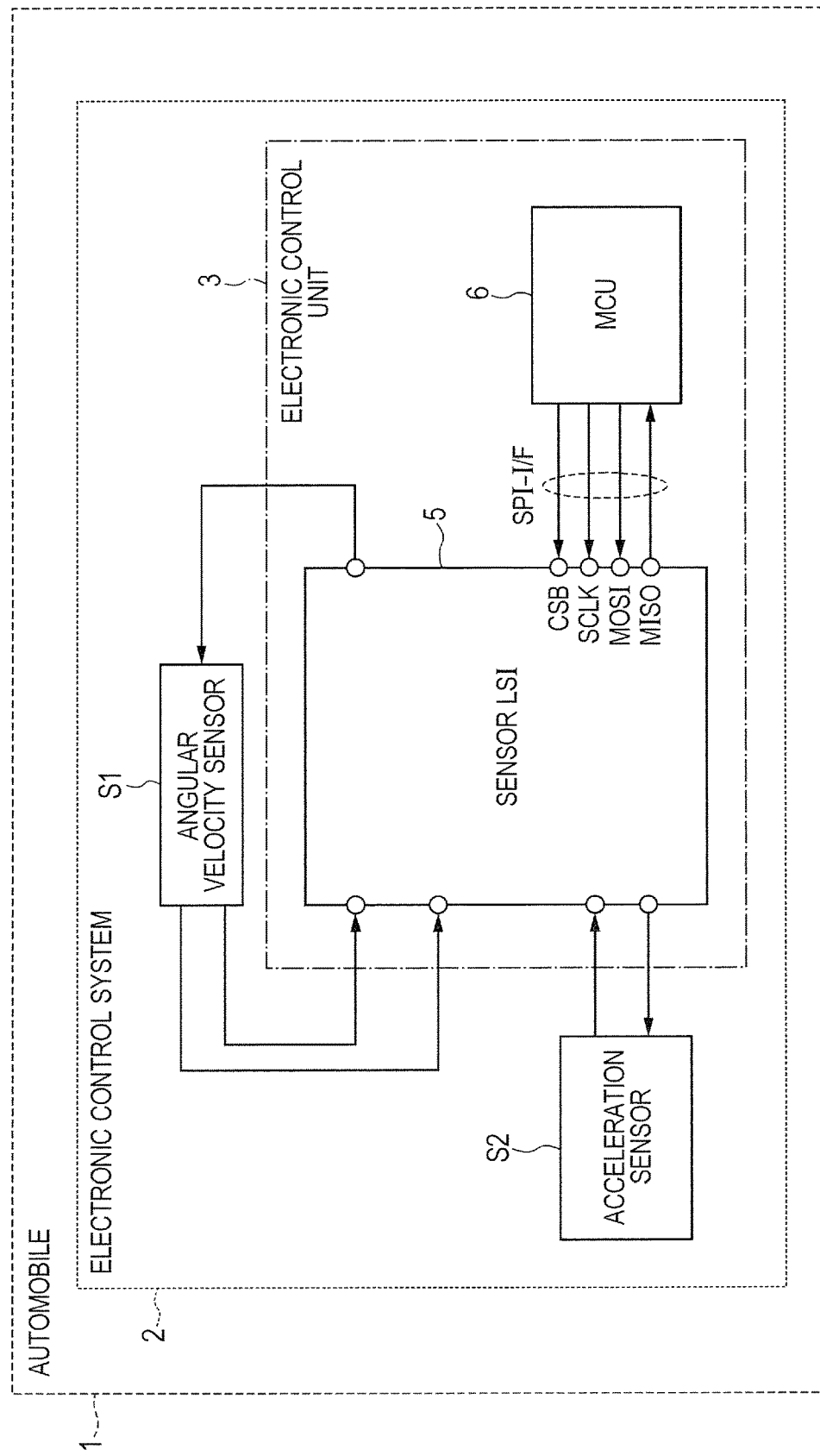
FIG. 1 is a block diagram showing the schematic configuration of an electronic control system mounted in an automobile according to a first embodiment.

Embodiments will be described below with reference to the accompanying drawings. The drawings are simplified and thus the technical scope of the embodiments should not be limited by the drawings. The same elements are indicated by the same reference numerals and the explanation thereof is omitted.

In the following embodiments, the explanation is optionally divided into multiple sections or multiple embodiments that are relevant to one another unless otherwise specified. One of the sections or embodiments is a modification, an application, a detailed description, or a supplementary explanation of some or all of the other sections or embodiments. In the following embodiments, the number of elements (including the number of elements, a numeric value, an amount, and a range) is not limited to a specific number unless otherwise specified and except that the number of elements is definitely limited to the specific number in principle. Thus, the number of elements may be equal to, or smaller or larger than the specific number.

In the following embodiments, the constituent elements (including operation steps) are not always necessary unless otherwise specified and except that the constituent elements are definitely necessary in principle. Similarly, in the following embodiments, the shapes and positional relationships of the constituent elements substantially include analogous or similar shapes and positional relationships unless otherwise specified and except that clearly different shapes or positional relationships are included in principle. This also holds true for the numbers (including the number of elements, a numeric value, an amount, and a range).

<Preliminary Examination by the Inventors>

Before a detailed explanation of a semiconductor device according to a first embodiment, a technique examined beforehand by the inventors will be discussed below. As described above, the need for safety of automobile functions has intensified and thus higher accuracy has been demanded of an angular velocity sensor and an acceleration sensor that are used for, for example, a sideslip detection system. In this case, the angular velocity sensor and the acceleration sensor have temperature characteristics that affect the detection accuracy of the angular velocity sensor and the acceleration sensor. Thus, a configuration for correcting temperature characteristics is necessary for improving the accuracy of the angular velocity sensor and the acceleration sensor. This requires temperature sensors with low noise characteristics in order to correct the temperature characteristics. Moreover, for guarantee of the temperature sensors, failures may be detected with redundancy. Thus, the inventors examined a system including a main temperature sensor and a sub temperature sensor. In this system, temperature data detected from the main temperature sensor is used for correcting temperature characteristics; meanwhile, a difference between pieces of temperature data detected from the temperature sensors is always monitored so as to detect failures of one of the temperature sensors.

Figure 15:
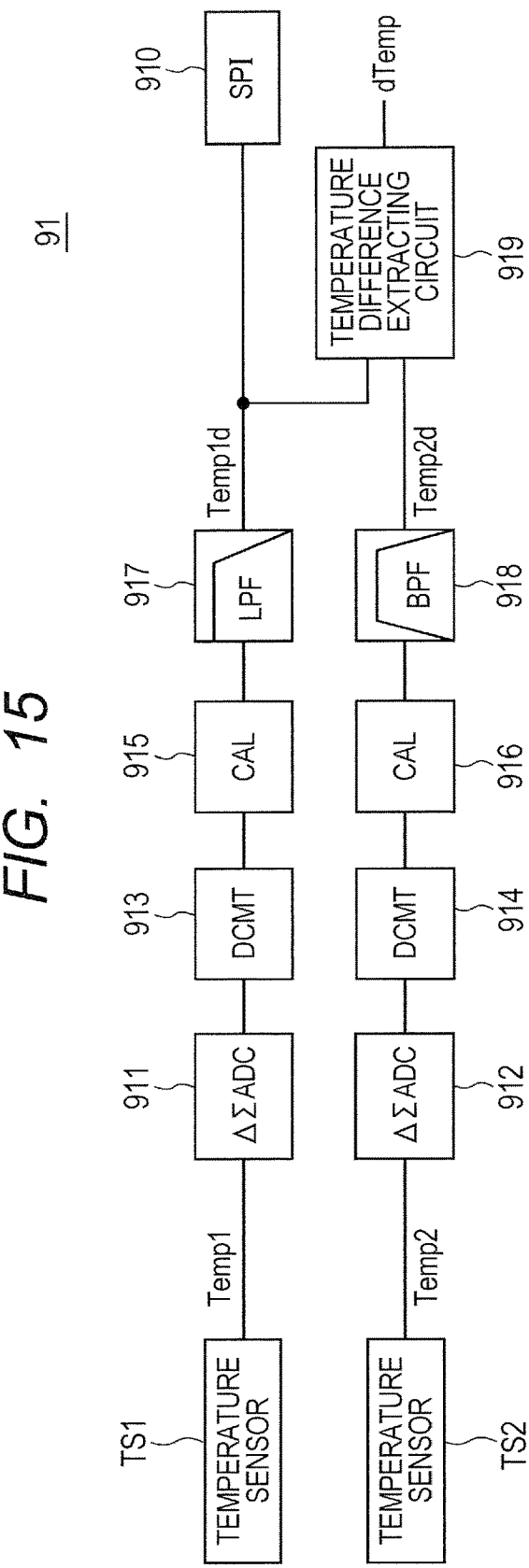
FIG. 15 is a block diagram showing a configuration example of a semiconductor device according to a concept before arrival at the present embodiment.

FIG. 15 is a block diagram showing a configuration example of a semiconductor device 91 according to a concept before arrival at the present embodiment. A semiconductor device 91 includes temperature sensors TS1 and TS2, delta sigma-analog digital converters (ADC) 911 and 912, decimation filters (DCMT) 913 and 914, calibrations (CAL) 915 and 916, a low-pass filter (LPF) 917, a band-pass filter (BPF) 918, a serial peripheral interface (SPI) 910, and a temperature difference extracting circuit 919.

The two temperature sensors TS1 and TS2 separately detect the temperature of the semiconductor device 91 that is a common object to be detected. The delta sigma ADC 911, the DCMT 913, the CAL 915, and the LPF 917 process temperature data Temp1, which is an analog output signal of the temperature sensor TS1, and then output outputted temperature data Temp1$d$ that is a digital signal. The delta sigma ADC 912, the DCMT 914, the CAL 916, and the BPF 918 process temperature data Temp2, which is an analog output signal of the temperature sensor TS2, and then output outputted temperature data Temp2$d$ that is a digital signal.

The SPI 910 outputs the output temperature data Temp1$d$ from the LPF 917 to, for example, a microcomputer (not shown). The semiconductor device 91 calculates a correction for canceling the temperature characteristics of an angular velocity sensor (not shown) and an acceleration sensor (not shown), according to the output temperature data Temp1$d$ based on the temperature data Temp1 detected by the temperature sensor TS1 serving as a main sensor.

The temperature difference extracting circuit 919 calculates a difference between the output temperature data Temp1$d$ and the output temperature data Temp2$d$ and outputs the difference as temperature difference data dTemp. Thus, failures of the temperature sensor TS1 or TS2 can be detected using the temperature difference data dTemp downstream of the semiconductor device 91. In the semiconductor device 91, the delta sigma ADC is necessary for each of the temperature sensors, disadvantageously increasing a circuit size, that is, a circuit area.

Figure 16:
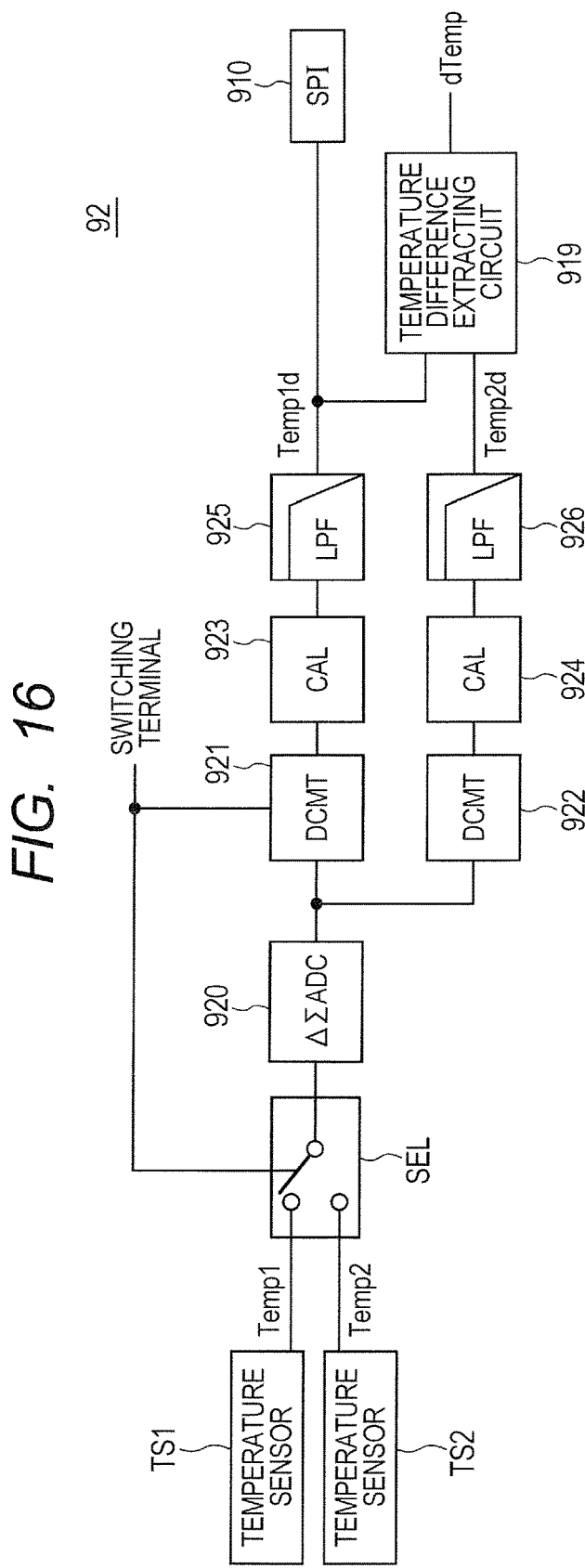
FIG. 16 is a block diagram showing a configuration example of a semiconductor device according to a concept before arrival at the present embodiment.

Referring to FIG. 16, a semiconductor device 92 examined as a solution to the problem of the semiconductor device 91 will be discussed below. FIG. 16 is a block diagram showing a configuration example of the semiconductor device 92 according to a concept before arrival at the present embodiment. The semiconductor device 91 includes the two ADCs for the respective temperature sensors TS1 and TS2, whereas the semiconductor device 92 includes a single delta sigma ADC 920 for two temperature sensors TS1 and TS2. The semiconductor device 92 includes the temperature sensors TS1 and TS2, a switching circuit SEL, a delta sigma ADC 920, DCMTs 921 and 922, CALs 923 and 924, LPFs 925 and 926, an SPI 910, and a temperature difference extracting circuit 919. The switching circuit SEL periodically switches temperature data Temp1 or Temp2 as an input to the ADC 920. The ADC 920 converts the temperature data Temp1 or Temp2, which is an inputted analog signal, to a digital signal, and then outputs the signal to the DCMT 921 or 922. An input from the ADC 920 to the DCMT 921 or 922 is periodically switched in synchronization with the switching circuit SEL. Thus, the semiconductor device 92 extracts temperature data under time sharing control. Subsequently, the DCMT 921, the CAL 923, and the LPF 925 process an input from the ADC 920 and then output temperature data Temp1$d$ is outputted. The DCMT 922, the CAL 924, and the LPF 926 process an input from the ADC 920 and then output temperature data Temp2$d$ is outputted. Processing by the SPI 910 and the temperature difference extracting circuit 919 is identical to that of FIG. 15. At this point, only one of the DCMTs 921 and 922 receives an output digital signal from the DC 920. Thus, the DCMTs 921 and 922 keep preceding input data in the absence of the output digital signal. In other words, the DCMTs 921 and 922 of the semiconductor device 92 do not receive the output digital signal from the ADC 920 for a certain period. This may eliminate continuity of data and cause folding noise to deteriorate characteristics.

Therefore, in order to prevent an increase in circuit size in the semiconductor device 91 and folding noise from deteriorating characteristics in the semiconductor device 92, a semiconductor device according to the present embodiment has been devised so as to accurately detect a temperature and a temperature difference by means of a single analog-to-digital converter circuit and accurately detect abnormalities of multiple internal sensors (including a temperature sensor).

First Embodiment

FIG. 1 is a block diagram showing the schematic configuration of an electronic control system 2 mounted in an automobile 1 according to a first embodiment. The electronic control system 2 detects, for example, a sideslip of the automobile 1 according to the detection results of an angular velocity sensor S1 and an acceleration sensor S2, and then the electronic control system 2 controls an airbag. The electronic control system 2 includes temperature sensors (not shown, will be discussed later) used for correcting the temperature characteristics of the angular velocity sensor S1 and the acceleration sensor S2. Moreover, in the electronic control system 2, the temperature sensor has redundancy for detecting failures of the temperature sensors. Configurations other than the electronic control system 2 in the automobile 1 have been already known and thus will not be illustrated or described. The electronic control system 2 may perform any processing according to the output results of at least one sensor. The angular velocity sensor S1 and the acceleration sensor S2 are examples of an external sensor, and the temperature sensor is an example of an internal sensor included in an LSI. The present invention is not limited to these sensors.

The electronic control system 2 includes the angular velocity sensor S1, the acceleration sensor S2, and an electronic control unit 3. The electronic control unit 3 includes a sensor large-scale integration (LSI) (semiconductor device) 5 and a micro control unit (MCU, processor) 6.

The angular velocity sensor S1 includes a resonant element and detects an angular velocity of the automobile. The angular velocity sensor 91 is, for example, a tuning fork-type angular velocity sensor including a turning fork resonated so as to generate a Coriolis force according to an angular velocity. The angular velocity sensor S1 receives a resonance signal from the sensor LSI 5, modulates the signal, and then outputs the resonance signal and a sensed signal to the sensor LSI 5. In this case, the resonance signal outputted from the angular velocity sensor S1 is used as a carrier wave of the sensed signal while the sensed signal is outputted after being AM-modulated by the resonance signal.

The acceleration sensor S2 is, for example, a capacitance acceleration sensor that fluctuates in capacitance according to an acceleration. The acceleration sensor 32 is not limited to a capacitance sensor and may include, for example, a piezoresistance sensor. The acceleration sensor S2 receives a driving voltage signal from the sensor LSI 5, modulates the signal, and then outputs an acceleration signal as the sensed signal to the sensor LSI 5.

(The Configuration of the Sensor LSI 5)

Figure 2:
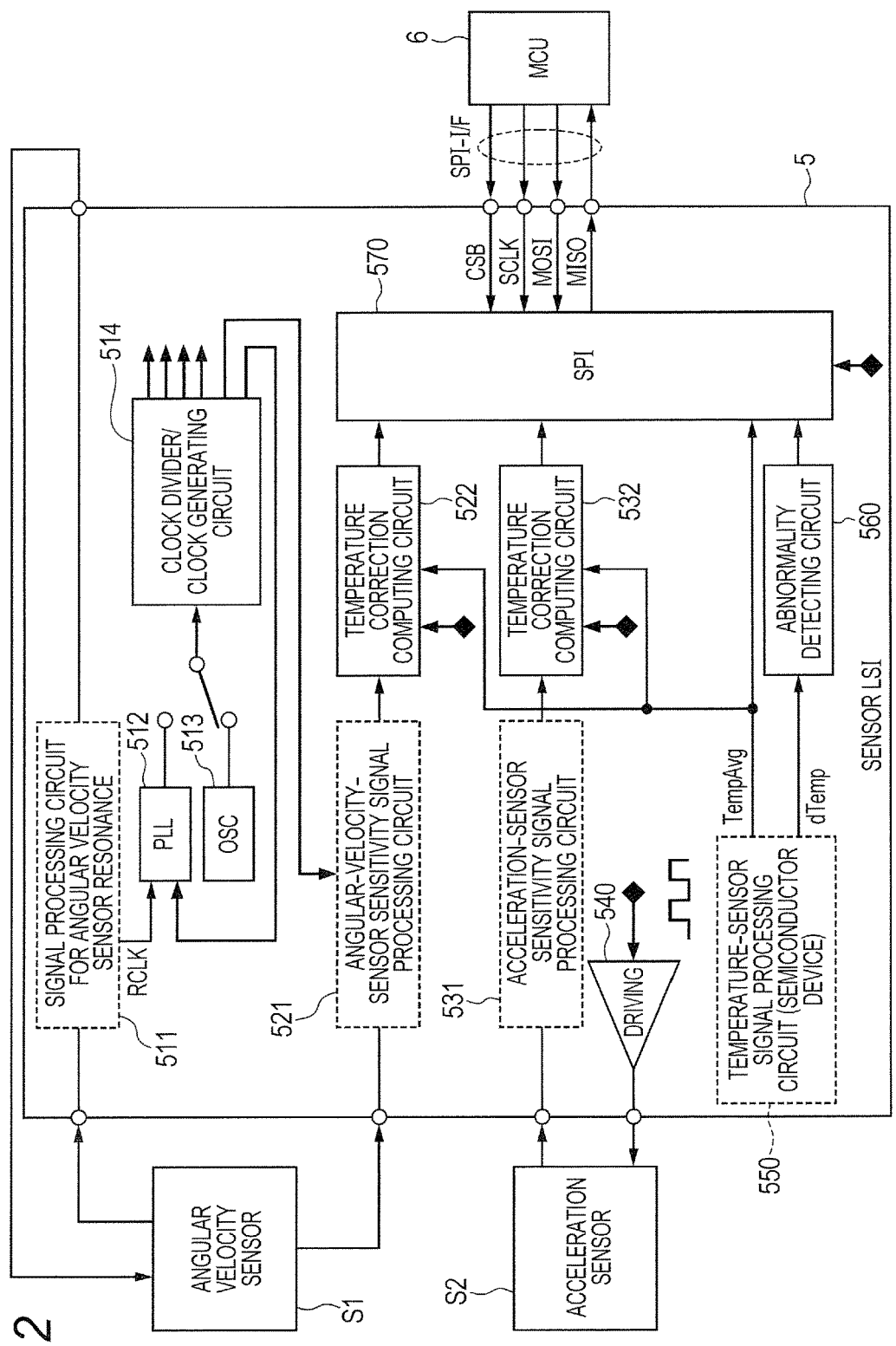
FIG. 2 is a block diagram showing the configuration of a sensor LSI according to the first embodiment.

Referring to FIG. 2, the configuration of the sensor LSI 5 will be specifically described below.

FIG. 2 is a block diagram showing the configuration of the sensor LSI 5 according to the first embodiment. The sensor LSI 5 is coupled to the angular velocity sensor S1, the acceleration sensor S2, and the MCU 6. The sensor LSI 5 includes a signal processing circuit 511 for angular velocity sensor resonance, a phase locked loop (PLL) 512, an oscillator (OSC) 513, a clock divider/clock generating circuit 514, an angular-velocity-sensor sensitivity signal processing circuit 521, a temperature correction computing circuit 522, an acceleration-sensor sensitivity signal processing circuit 531, a temperature correction computing circuit 532, a driving buffer 540, a temperature-sensor signal processing circuit 550, an abnormality detecting circuit 560, and an SPI 570. The signal processing circuit 511 for angular velocity sensor resonance, the angular-velocity-sensor sensitivity signal processing circuit 521, the acceleration-sensor sensitivity signal processing circuit 531, and the temperature-sensor signal processing circuit 550 are each illustrated as a single circuit for the sake of explanation. These circuits may be illustrated as functional blocks including the circuits of FIGS. 3, 4, 5, and 6.

Figure 3:
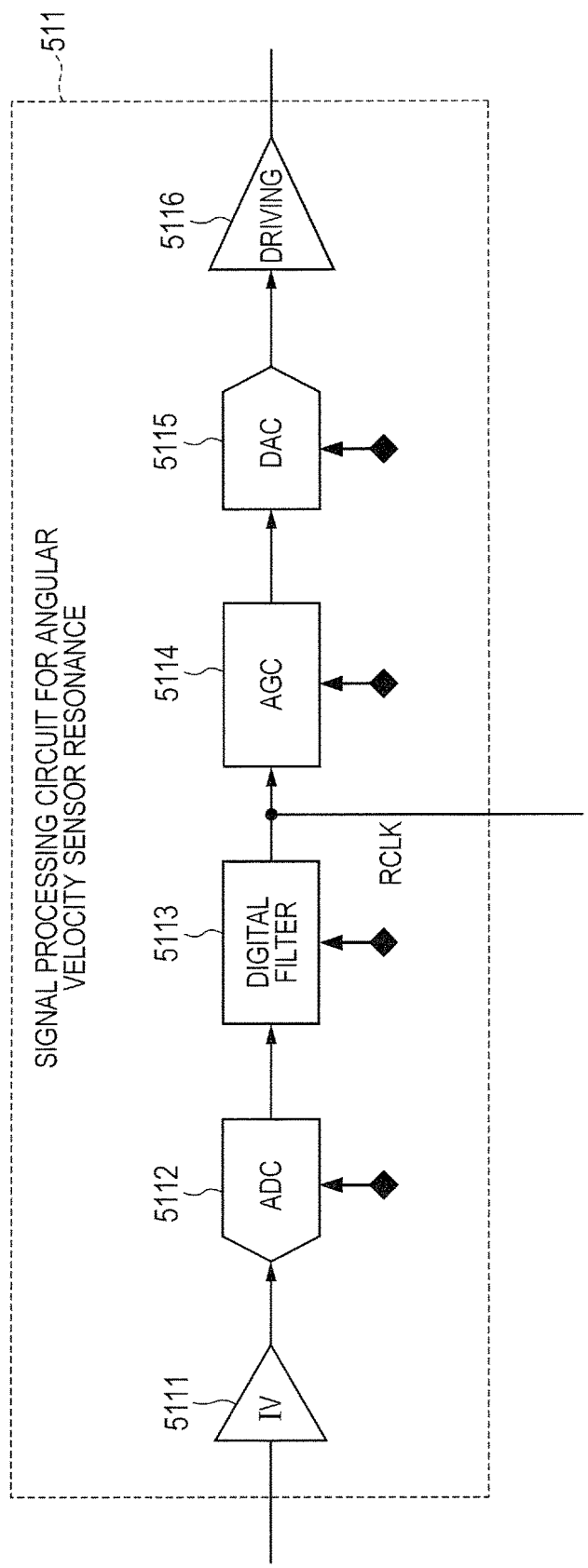
FIG. 3 is a block diagram showing the configuration of a signal processing circuit for angular velocity sensor resonance according to the first embodiment.

The signal processing circuit 511 for angular velocity sensor resonance receives a resonance signal from the angular velocity sensor S1, outputs a reference clock signal RCLK to the PLL 512, and then outputs the resonance signal to the angular velocity sensor S1. FIG. 3 is a block diagram showing the configuration of the signal processing circuit 511 for angular velocity sensor resonance according to the first embodiment. The signal processing circuit 511 for angular velocity sensor resonance includes an IV conversion amplifier 5111, an ADC 5112, a digital filter 5113, an auto gain control (AGC) 5114, a DAC 5115, and a driving buffer 5116. The IV conversion amplifier 5111 converts the sensed signal from the angular velocity sensor S1 to a voltage value. The ADC 5112 outputs the sensed signal, which is converted to the voltage value by the IV conversion amplifier 5111, after AD conversion on the signal. The digital filter 5113 removes noise components contained in the output signal of the ADC 5112 end then extracts resonance frequency components. In this case, the output signal of the digital filter 5113 is a digital sine wave that is used as the reference clock signal RCLK and is outputted to the AGC 5114 and the PLL 512. The AGC 5114 adjusts the gain of the output signal according to the amplitude of the reference clock signal RCLK. The DAC 5115 outputs the output signal of the AGC 5114 after DA conversion on the signal. The driving buffer 5116 outputs the output signal of the DAC 5115 as a resonance signal to the angular velocity sensor S1.

Referring to FIG. 2 again, the OSC 513 is an oscillation circuit used for turning on the sensor LSI 5. The OSC 513 generates a clock signal and then outputs the signal. The PLL 512 receives the reference clock signal RCLK from the signal processing circuit 511 for angular velocity sensor resonance and the clock signal from the clock divider/clock generating circuit 514, generates a clock signal by multiplying the reference clock signal RCLK, and then outputs the signal. The clock divider/clock generating circuit 514 receives the clock signal from the OSC 513 when the sensor LSI 5 is turned on, and receives the clock signal from the PLL 512 after stabilizing the resonance of the angular velocity sensor S1 and the operation of the PLL 512. The clock divider/clock generating circuit 514 generates a clock signal with a predetermined frequency based on the inputted clock signal and then outputs the signal as a clock signal of a digital circuit.

Figure 4:
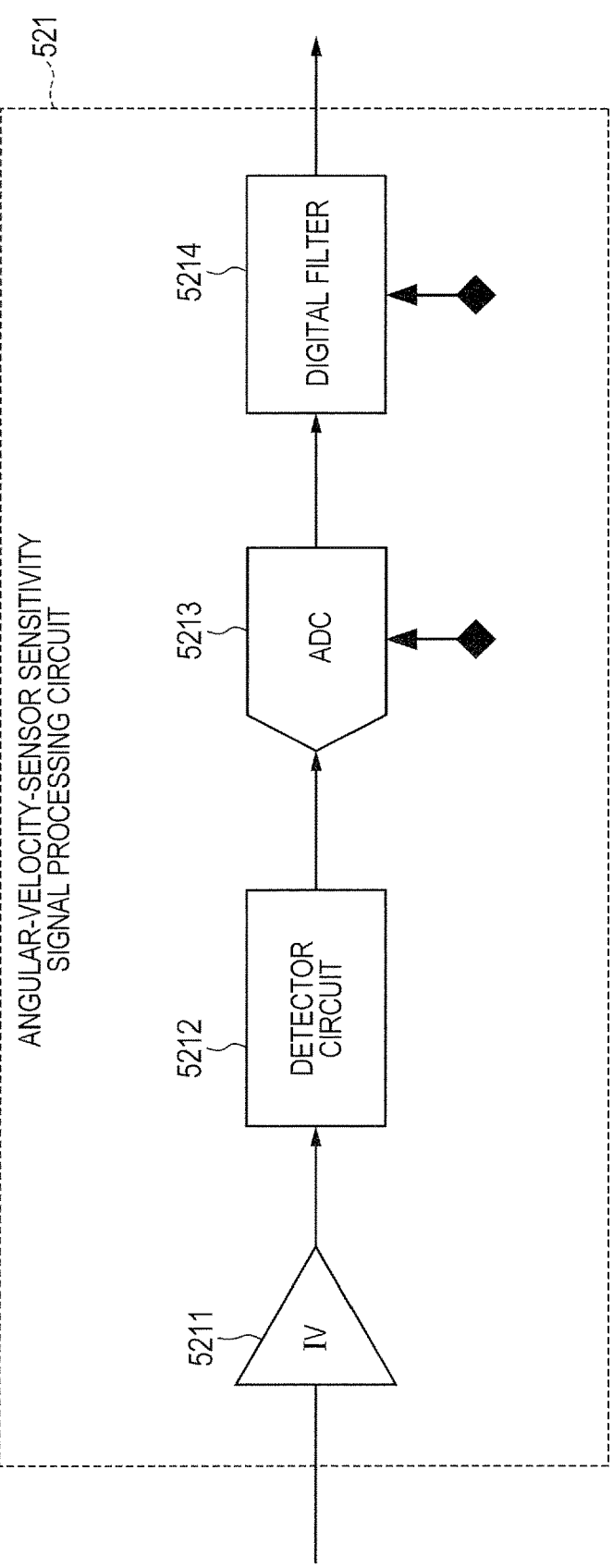
FIG. 4 is a block diagram showing the configuration of an angular-velocity-sensor sensitivity signal processing circuit according to the first embodiment.

The angular-velocity-sensor sensitivity, signal processing circuit 521 receives the sensed signal from the angular velocity sensor S1, extracts angular velocity components, and then outputs the components to the temperature correction computing circuit 522. FIG. 4 is a block diagram showing the configuration of the angular-velocity-sensor sensitivity signal processing circuit 521 according to the first embodiment. The angular-velocity-sensor sensitivity signal processing circuit 521 includes an IV conversion amplifier 5211, a detector circuit 5212, an ADC 5213, and a digital filter 5214. The IV conversion amplifier 5211 converts the sensed signal from the angular velocity sensor S1 to a voltage value. The detector circuit 5212 detects angular velocity components from the signal converted to the voltage value by the IV conversion amplifier 5211, and then outputs the signal. The detector circuit 5212 operates particularly based on the clock signal outputted from the clock divider/clock generating circuit 514. The ADC 5213 outputs the signal detected by the detector circuit 5212, after AD conversion on the signal. The digital filter 5214 removes noise contained in the output signal of the ADC 5213 and then outputs the signal to the temperature correction computing circuit 522.

Figure 5:
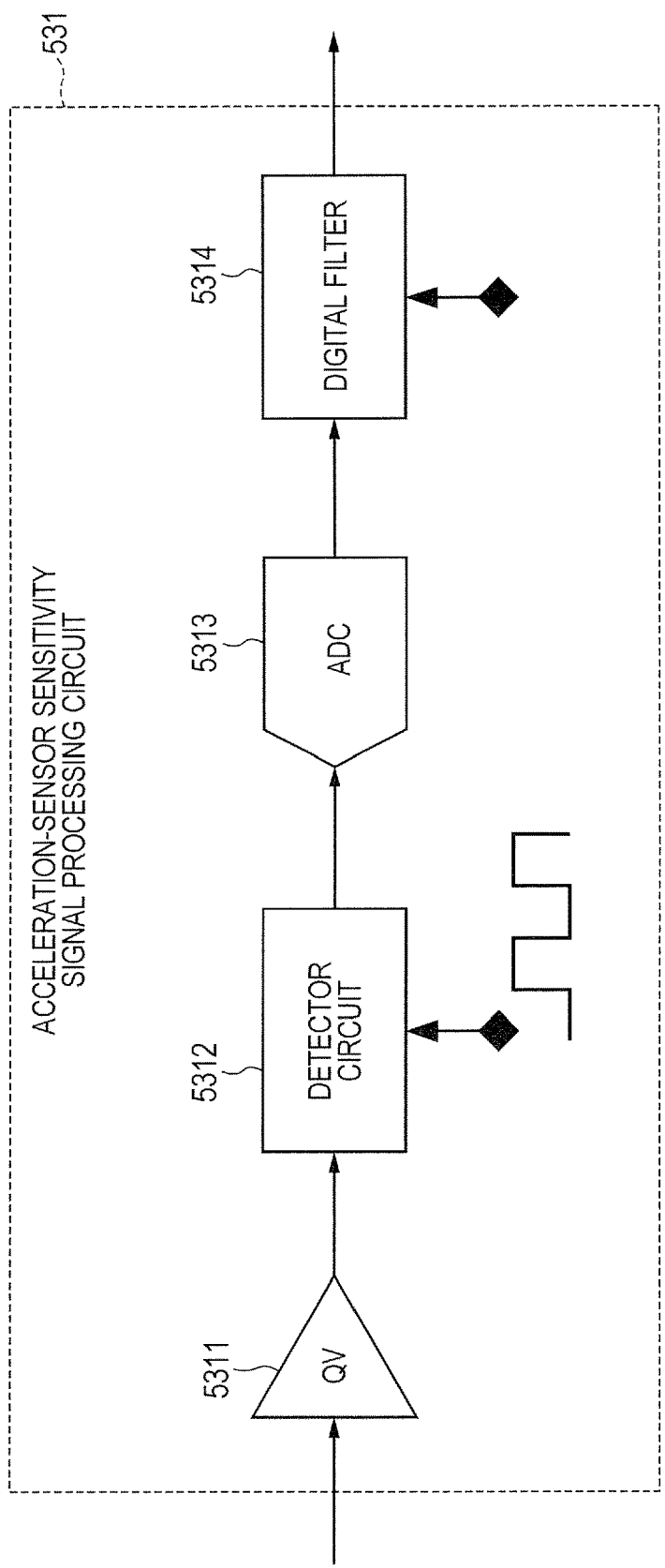
FIG. 5 is a block diagram showing the configuration of an acceleration-sensor sensitivity signal processing circuit according to the first embodiment.

Referring to FIG. 2 again, the acceleration-sensor sensitivity signal processing circuit 531 receives the sensed signal from the acceleration sensor S2, extracts acceleration components, and then outputs the components to the temperature correction computing circuit 532. FIG. 5 is a block diagram showing the configuration of the acceleration-sensor sensitivity signal processing circuit 531 according to the first embodiment. The acceleration-sensor sensitivity signal processing circuit 531 includes a QV conversion amplifier 5311, a detector circuit 5312, an ADC 5313, and a digital filter 5314. The QV conversion amplifier 5311 converts the sensed signal from the acceleration sensor S2 to a voltage value. The detector circuit 5312 detects acceleration components from the signal converted to the voltage value by the QV conversion amplifier 5311, and then outputs the signal. The detector circuit 5312 operates particularly based on the clock signal outputted from the clock divider/clock generating circuit 514. The ADC 5313 outputs the signal detected by the detector circuit 5312, after AD conversion on the signal. The digital filter 5314 removes noise contained in the output signal of the ADC 5313 and then outputs the signal to the temperature correction computing circuit 532.

Referring to FIG. 2 again, the driving buffer 540 generates a driving voltage signal based on the clock signal outputted from the clock divider/clock generating circuit 514, and then outputs the signal to the acceleration sensor S2.

Figure 6:
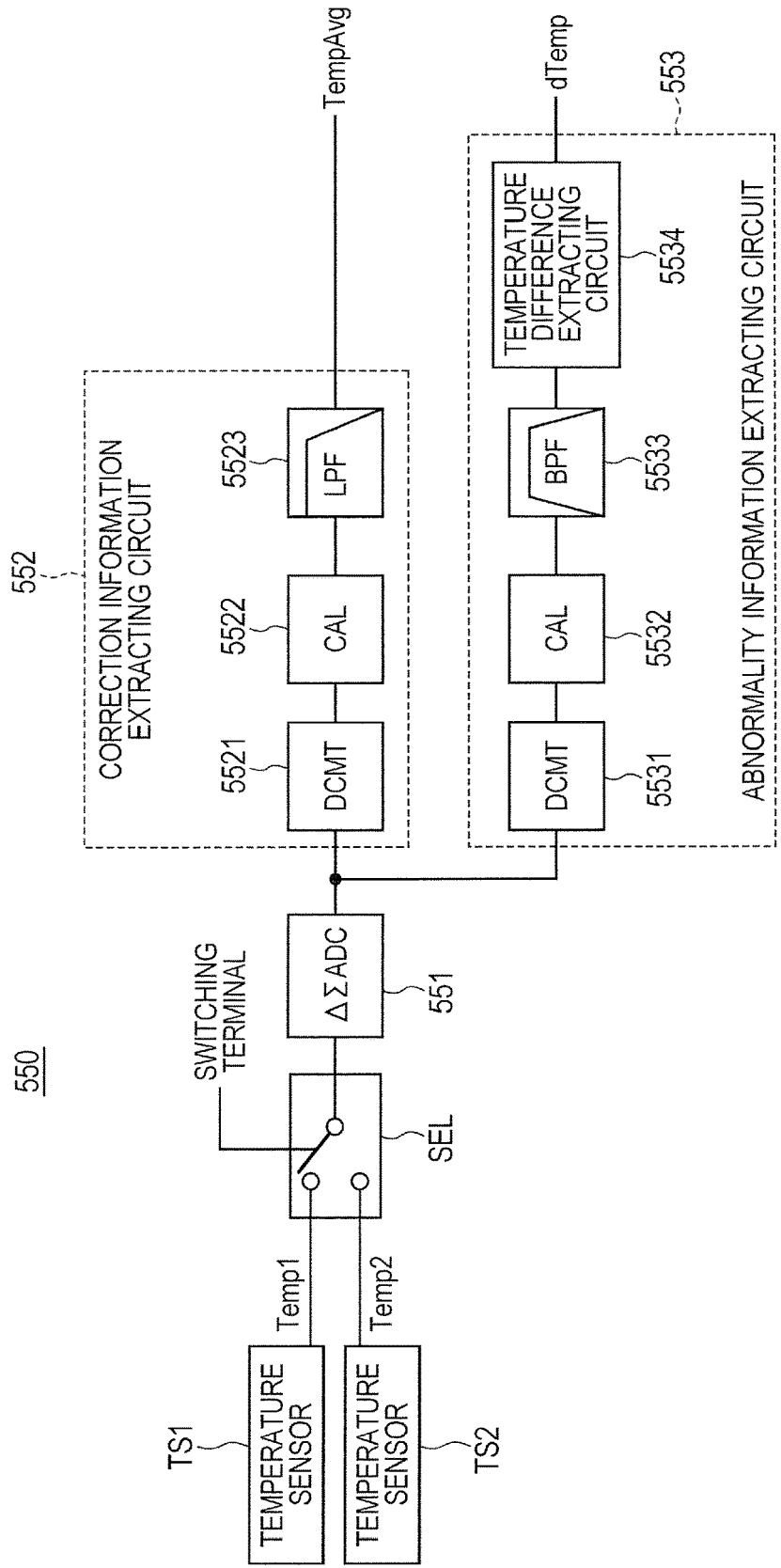
FIG. 6 is a block diagram showing the configuration of a semiconductor device according to the first embodiment.

The temperature-sensor signal processing circuit 550 is an example of the semiconductor device according to the present embodiment. The temperature-sensor signal processing circuit 550 includes a main temperature sensor and a sub temperature sensor. Data is inputted while temperature detection signals outputted from the temperature sensors are periodically switched, and then the mean value of temperatures detected by the main and sub temperature sensors and a signal of a difference value between the detected temperatures are extracted from an AD-converted digital signal. The temperature-sensor signal processing circuit 550 outputs the mean value of the extracted temperatures to the temperature correction computing circuits 522 and 532 and the SPI 570. The temperature-sensor signal processing circuit 550 outputs a difference value between the extracted temperatures to the abnormality detecting circuit 560. Referring to FIG. 6, the temperature-sensor signal processing circuit 550 will be specifically described below.

According to temperature data outputted from the temperature-sensor signal processing circuit 550, the temperature correction computing circuit 522 performs zero-point correction or gain correction, that is, a correcting operation on a signal indicating angular velocity components outputted from the angular-velocity-sensor sensitivity signal processing circuit 521, and then the temperature correction computing circuit 522 outputs the signal to the SPI 570. According to temperature data outputted from the temperature-sensor signal processing circuit 550, the temperature correction computing circuit 532 performs zero-point correction or gain correction, that is, a correcting operation on a signal indicating angular velocity components outputted from the acceleration-sensor sensitivity signal processing circuit 531, and then the temperature correction computing circuit 532 outputs the signal to the SPI 570.

The abnormality detecting circuit 560 decides the presence or absence of abnormalities of the temperature sensor TS1 or TS2 based on temperature difference data outputted from the temperature-sensor signal processing circuit 550, and then the abnormality detecting circuit 560 outputs the result to the SPI 570 as an abnormality detection result. Specifically, if it is decided that the temperature difference data exceeds a predetermined value, the abnormality detecting circuit 560 detects that the temperature sensor TS1 or TS2 has an abnormality.

The SPI 570 receives corrected angular velocity data outputted from the temperature correction computing circuit 522, corrected acceleration data outputted from the temperature correction computing circuit 532, the temperature data outputted from the temperature-sensor signal processing circuit 550, and the abnormality detection result outputted from the abnormality detecting circuit 560, and then outputs the data to the MCU 6. The SPI 570 receives signals from the MCU 6 through a chip select bar (CSB), a serial clock (SCLK), and a master out slave in (MOSI), and outputs signals to the MCU 6 through a master in slave out (MISO).

The MCU 6 is an example of a processor that performs predetermined operations according to the outputs of the temperature correction computing circuits 522 and 532 or the output of the abnormality detecting circuit 560. In other words, the MCU 6 performs predetermined operations based on the angular velocity data and acceleration data that is corrected by the sensor LSI 5. Specifically, for example, if it is decided that the automobile 1 has an excessive angular velocity (rotation speed) according to the detection result of the angular velocity sensor S1, the MCU 6 automatically controls an engine so as to prevent a sideslip of the automobile. If the acceleration of the automobile 1 rapidly decreases according to the detection result of the acceleration sensor S2 (specifically, a collision to an obstacle), the MCU 6 automatically controls airbag activation.

(The Configuration of the Temperature-Sensor Signal Processing Circuit 550)

FIG. 6 is a block diagram showing the configuration of the temperature-sensor signal processing circuit 550 according to the first embodiment. The temperature-sensor signal processing circuit 550 includes temperature sensors TS1 and TS2, a switching circuit SEL, a delta sigma ADC 551, a correction information extracting circuit 552, and an abnormality information extracting circuit 553. The temperature-sensor signal processing circuit 550 has a sense line that is shared by the temperature sensors TS1 and TS2 receives signals in a time sharing manner. The temperature-sensor signal processing circuit 550 does not time-share extraction of input signals (temperature data Temp1 and Temp2) from the temperature sensors TS1 and TS2 but process the input signals as consecutive data and uses the mean value of the temperature data Temp1 and Temp2 as the sensitivity of the sense line. In the temperature-sensor signal processing circuit 550, a temperature value to be trimmed serves as a mean value and correction temperature data for the temperature correction computing circuits 522 and 532. Moreover, the temperature-sensor signal processing circuit 550 detects a Peak-Peak difference as a difference between the temperature data Temp1 and Temp2.

The temperature sensors TS1 and TS2 are examples of internal sensors that detect the same object to be detected in the semiconductor device according to the first embodiment. The temperature sensors TS1 and TS2 each detect a temperature of the sensor LSI 5 and then output the temperatures as the temperature data Temp1 and Temp2, respectively.

The switching circuit SEL outputs detection signals from the temperature sensors TS1 and TS2 after switching the signals at a predetermined frequency. Specifically, the switching circuit SEL periodically switches the temperature data Temp1 or Temp2 as an input to the delta sigma ADC 551 according to a frequency FCLK. The frequency FCLK is a reference frequency for switching the inputs of the temperature sensors TS1 and TS2. For example, the switching circuit SEL switches the temperature data Temp1 or Temp2, which is a detection signal outputted from the temperature sensor TS1 or TS2, with Duty of 50% at the frequency FCLK of 2.25 kHz, and then the switching circuit SEL outputs the data to the delta sigma ADC 551. The frequency FCLK is not limited to 2.25 kHz.

Figure 7:
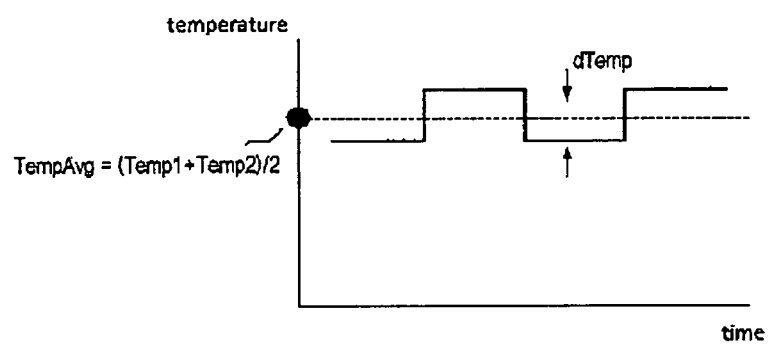
FIG. 7 shows an example of on input signal after digital conversion according to the first embodiment.

The delta sigma ADC 551 converts the temperature data Temp1 or Temp2 from an analog signal to a digital signal and then outputs the converted signal to the correction information extracting circuit 552 and the abnormality information extracting circuit 553. FIG. 7 shows an example of the input signal after digital conversion according to the first embodiment. The signal converted by the delta sigma ADC 551 (converted signal) at a constant temperature has a temperature mean value in a frequency band extremely lower than the frequency FCLK and includes temperature difference information in the band of the frequency FCLK. In other words, the converted signal includes a temperature average signal substantially corresponding to a direct-current component and a temperature difference signal corresponding to an alternating-current component at the frequency FCLK.

The correction information extracting circuit 552 is a path for extracting the mean value of detected temperatures. Specifically, the correction information extracting circuit 552 extracts a first frequency component (e.g., a temperature mean value) for correcting the output signal of an external sensor (e.g., the angular velocity sensor S1 and the acceleration sensor S2), from a converted signal based on the output of the switching circuit SEL. More specifically, the correction information extracting circuit 552 attenuates a second frequency component (e.g., the frequency component of the temperature difference signal) of the converted signal and extracts the first frequency component.

Figure 8:
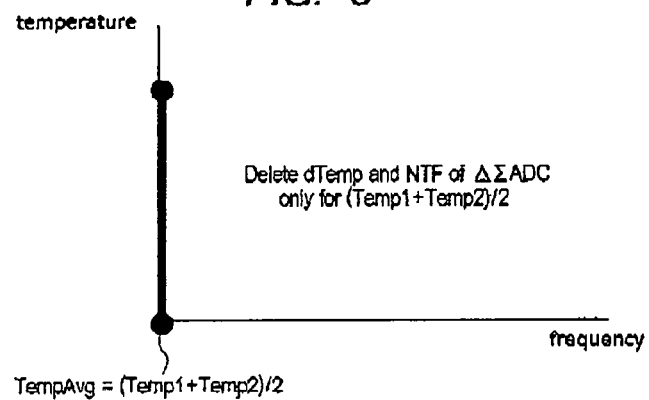
FIG. 8 shows an example of a temperature mean value according to the first embodiment.

The correction information extracting circuit 552 includes a DCMT 5521, a CAL 5522, and an LPF 5523. The DCMT 5521 is a decimation filter having a notch at the frequency FCLK for switching in the switching circuit SEL. In other words, the DCMT 5521 is a first decimation filter that attenuates the frequency component (second frequency component) of the temperature difference signal. The CAL 5522 is a correcting circuit that corrects variations in an analog signal in response to the output signal of the DCMT 5521. The CAL 5522 performs, for example, multiplication for adjusting the accuracy of 1 LSB of the delta sigma ADC 551 and addition for adjusting the offset of an analog circuit. The LPF 5523 removes noise from the output signal of the CAL 5522 to extract a temperature mean value. FIG. 8 shows an example of a temperature mean value according to the first embodiment. Specifically, FIG. 8 shows that temperature difference data dTemp and the noise transfer function (NTF) of the delta sigma ADC 551 are removed for the output signal of the delta sigma ADC 551 and extracts the value of (Temp1+Temp2)/2 (=TempAvg) corresponding to a direct-current component. In this case, temperature noise affects the noise characteristics of an angular velocity and an acceleration. Thus, the correction information extracting circuit 552 removes noise and extracts temperature data, thereby suppressing deterioration of noise characteristics.

The abnormality information extracting circuit 553 is a path for extracting a difference value between detected temperatures. Specifically, the abnormality information extracting circuit 553 extracts a second frequency component for detecting abnormalities of internal sensors (e.g., temperature sensors TS1 and TS2) from a converted signal based on the output of the switching circuit SEL. More specifically, the abnormality information extracting circuit 553 removes the first frequency component of the converted signal and extracts the second frequency component.

Figure 9:
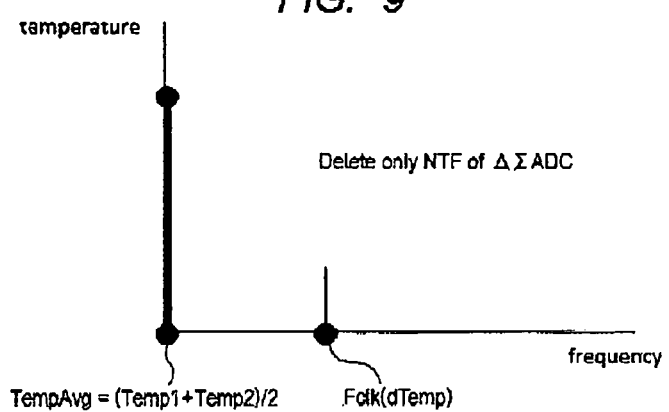
FIG. 9 shows an example of temperature data inputted to a BPF according to the first embodiment.
Figure 10:
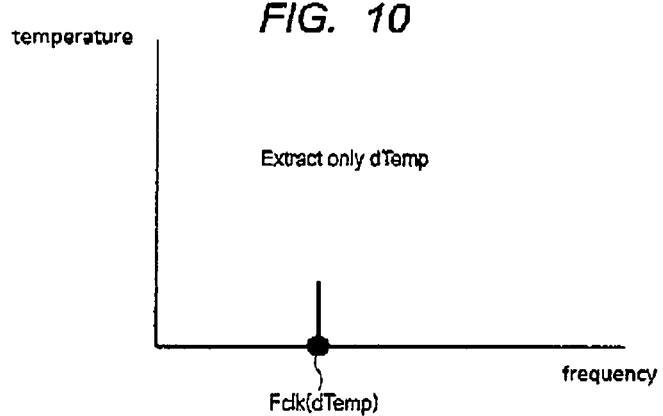
FIG. 10 shows an example of temperature difference data outputted from the BPF according to the first embodiment.

The abnormality information extracting circuit 553 includes a DCMT 5531, a CAL 5532, a BPF 5533, and a temperature difference extracting circuit (difference calculating circuit) 5534. The DCMT 5531 is a decimation filter having no notch at the frequency FCLK for switching in the switching circuit SEL. To be correct, the DCMT 5531 is a second decimation filter having a notch at a frequency not attenuating the frequency component of the temperature difference signal. The frequency not attenuating the frequency component of the temperature difference signal is, for example, a frequency (third frequency) at least twice the frequency FCLK. For example, the DCMT 5531 is the second decimation filter that has a notch at a frequency four times as high as the frequency FCLK and attenuates a third frequency component. The CAL 5532 is a correcting circuit identical to the CAL 5522. The BPF 5533 removes noise and the temperature mean value from the output signal of the CAL 5532 to extract a temperature difference mean value. FIG. 9 shows an example of temperature data inputted to the BPF according to the first embodiment. In FIG. 9, only the NTF of the delta sigma ADC 551 is deleted and the temperature data includes information on the mean value and a temperature difference between the two temperature sensors TS1 and TS2. FIG. 10 shows an example of temperature difference data outputted from the BPF according to the first embodiment. In FIG. 10, a temperature mean value TempAvg is removed from the information of FIG. 9 and only the temperature difference data dTemp is extracted.

Figure 11:
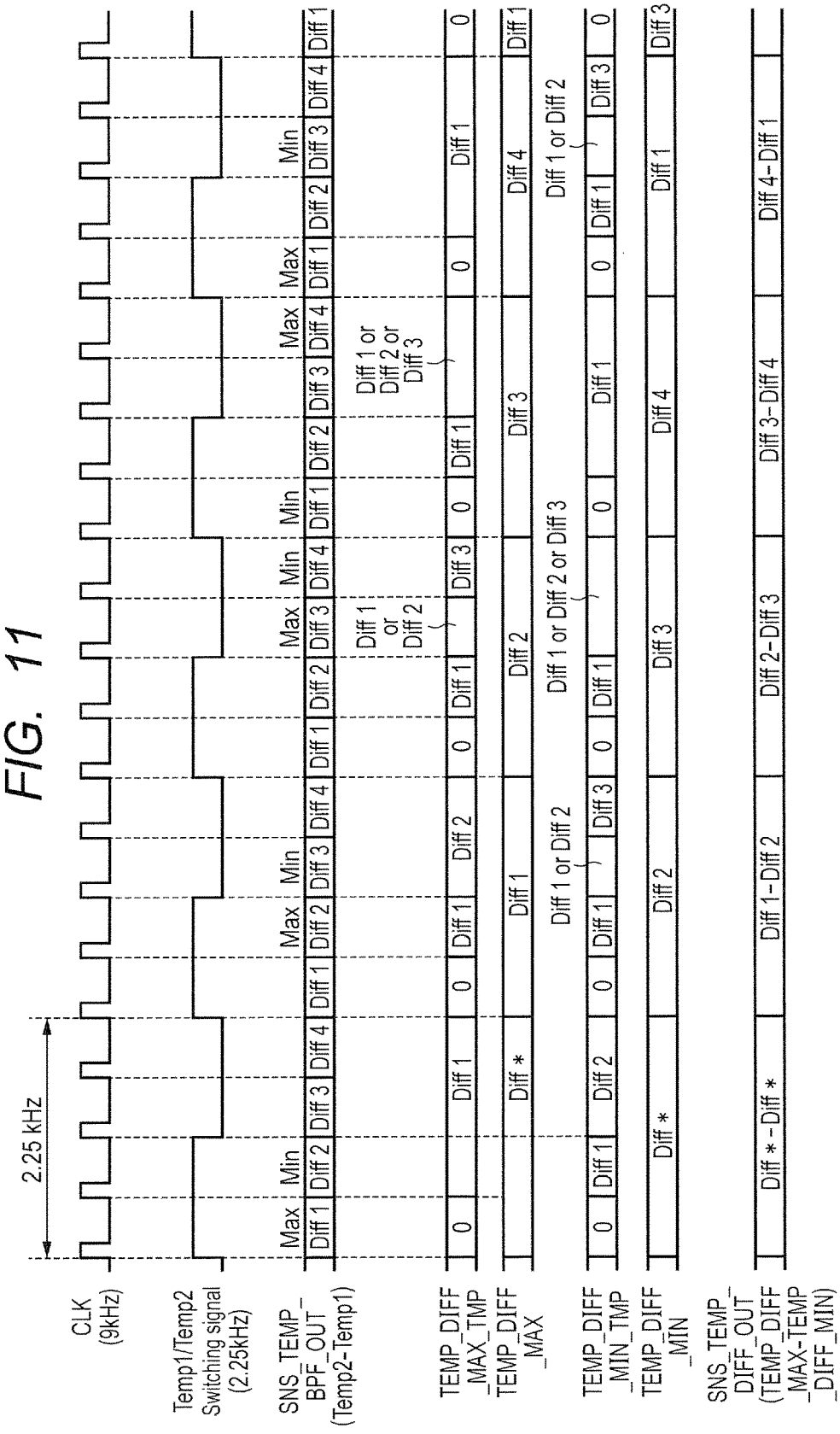
FIG. 11 is a timing chart of the extraction of temperature difference data according to the first embodiment.

The temperature difference extracting circuit 5534 calculates temperature difference data from the output signal of the BPF 5533. The temperature difference data is an example of a difference between the detection signals of the internal sensors. FIG. 11 is a timing chart of the extraction of the temperature difference data according to the first embodiment. In this case, the BPF 5533 has a sampling clock frequency CLK of 9 kHz and the frequency FCLK for switching in the switching circuit SEL is set at 2.25 kHz that is equivalent to four clocks of the frequency CLK. Thus, the temperature difference extracting circuit 5534 detects a maximum value and a minimum value for each of the four clocks of output data from the BPF 5533 and calculates a difference between the maximum value and the minimum value as the temperature difference data dTemp for each of the four clocks of the output data from the BPF 5533.

(The Effect of the First Embodiment)

With this configuration, the first embodiment can improve the accuracy of abnormality detection for the sensors having redundancy. This is because AD conversion is performed during periodic switching of the detection signals of the sensors having redundancy and then the same consecutive data is inputted to the correction information extracting circuit 552 and the abnormality information extracting circuit 553. Thus, the inputted consecutive data can contain the mean value of detected data and a difference value between the detection signals of the sensors. This keeps the continuity of inputted data, thereby preventing folding noise from deterioration of characteristics. Consequently, sensor data can be accurately extracted and abnormalities of the sensors with redundancy can be accurately detected. Since the single delta sigma ADC 551 is provided for the multiple sensors having redundancy, the circuit configuration and a chip area can be reduced.

In this case, the noise transfer function (NTF) of the delta sigma ADC is determined by an oversampling rate (Hereinafter, will be called OSR). For example, if the primary delta sigma ADC is used in the example of the first embodiment with a signal band of 50 Hz and a time division cycle of 2.25 kHz, the absence of time sharing control of the semiconductor device 92 can reduce noise by 20×log(50× 2/2.25 k)=−27 dB.

(Application of the First Embodiment: Sideslip Detection)

An application of the first embodiment will be discussed below. For example, if it is decided that the automobile 1 has an excessive angular velocity (rotation speed) according to the detection result of the angular velocity sensor S1, the electronic control unit 3 of FIG. 1 automatically controls the engine to prevent a sideslip of the automobile 1. Moreover, for example, if it is decided that the acceleration of the automobile 1 rapidly decreases according to the detection result of the acceleration sensor 82, the electronic control unit 3 automatically controls airbag activation.

Figure 12:
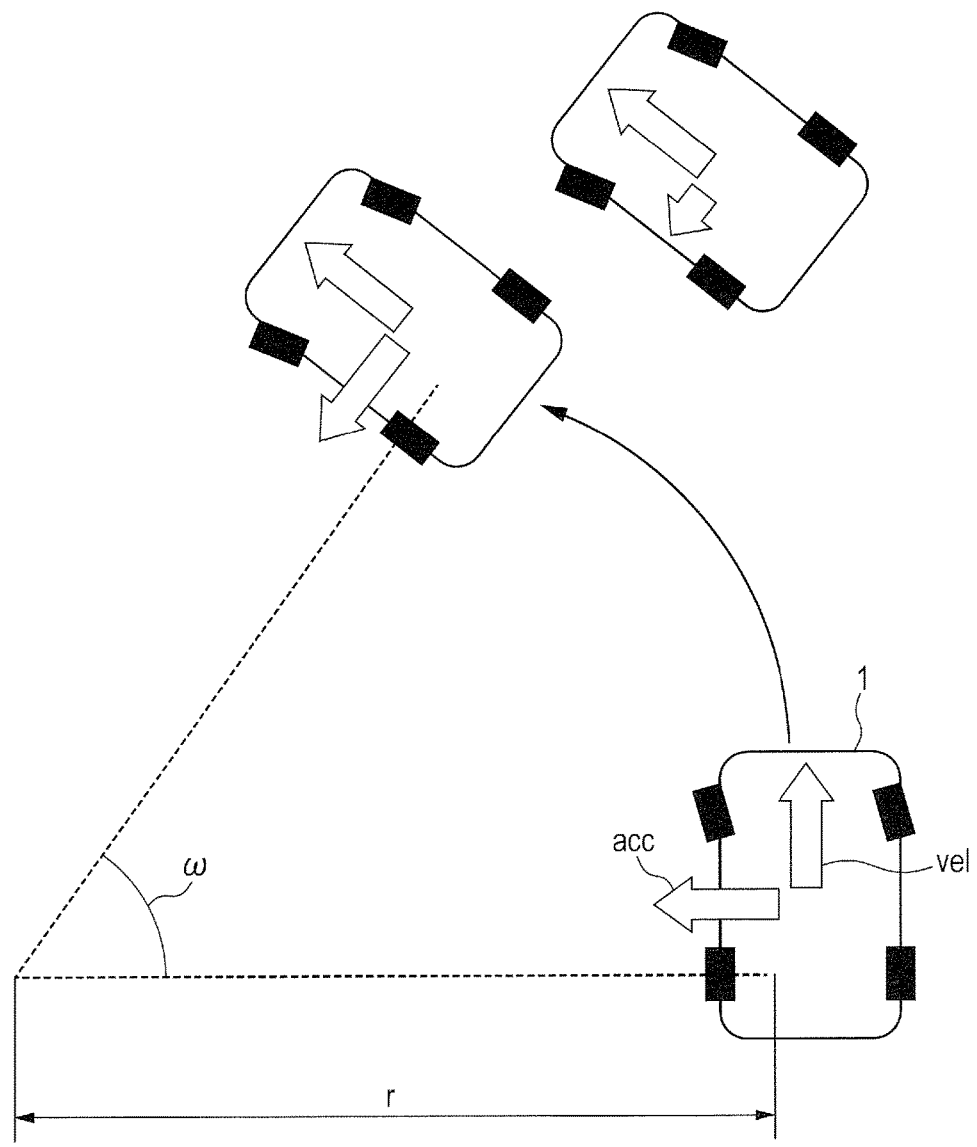
FIG. 12 is an explanatory drawing showing an application of an angular velocity sensor and an acceleration sensor according to the first embodiment.

FIG. 12 is an explanatory drawing showing an application of the angular velocity sensor S1 and the acceleration sensor S2 according to the first embodiment. FIG. 12 shows an example of detection of a sideslip of the automobile 1. In this example, the automobile 1 rotates to the left with a turning radius r and an angular velocity ω. In this case, the automobile 1 has a velocity vel and an acceleration ace along the center of rotation. Generally, the velocity vel can be determined by the number of rotations of a tire while the turning radius r can be determined by a steering angle. Thus, the angular velocity sensor S1 can also calculate the angular velocity by dividing the velocity vel by the turning radius r. Furthermore, the acceleration sensor 92 can also calculate the acceleration acc along the center of rotation by multiplying the turning radius r by the square of the angular velocity ω. Alternatively, the angular velocity sensor S1 and the acceleration sensor S2 can directly detect the angular velocity and the acceleration acc.

Second Embodiment

A second embodiment is a modification of the first embodiment. In the second embodiment, temperature difference data s extracted by detection and information extracting circuit. Thus, in the automobile 1, the electronic control system 2, the electronic control unit 3, the sensor LSI 5, and the temperature-sensor signal processing circuit 550, a correction information extracting circuit and an abnormality information extracting circuit are replaced with those of FIG. 13 so as to be applicable to the second embodiment. Other configurations are identical to those of the first embodiment and thus will not be shown or described.

Figure 13:
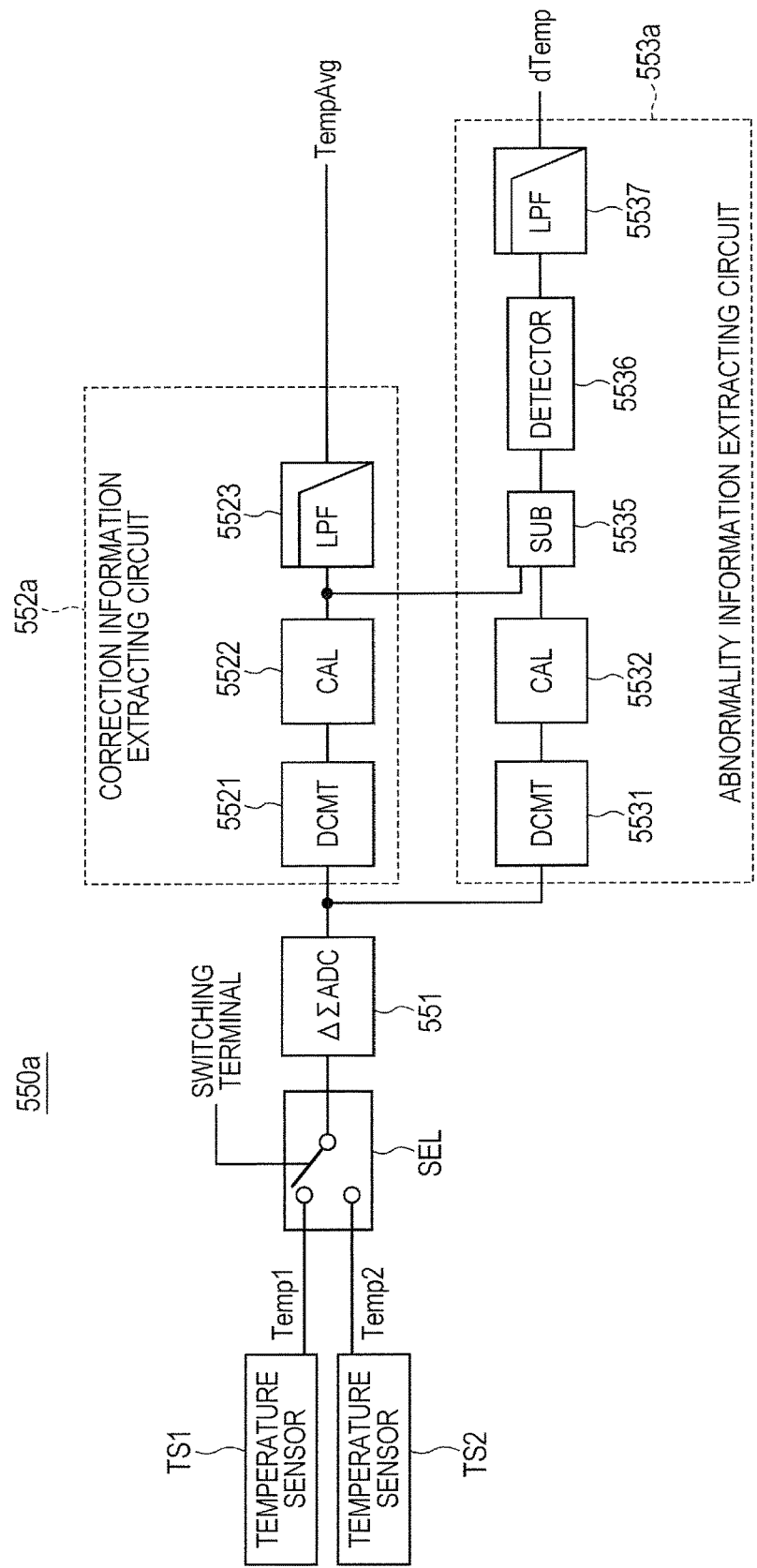
FIG. 13 is a block diagram showing the configuration of a semiconductor device according to a second embodiment.
Figure 14:
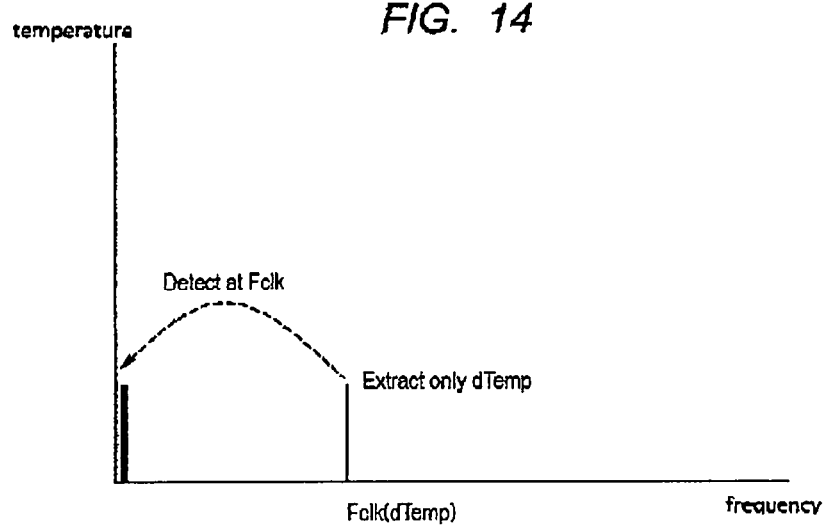
FIG. 14 shows an example of temperature difference data detected according to the second embodiment.

FIG. 13 is a block diagram showing the configuration of a temperature-sensor information extracting circuit 550a that is an example of a semiconductor device according to the second embodiment. The temperature-sensor information extracting circuit 550a is different from the temperature-sensor signal processing circuit 550 of FIG. 6 in the provision of a correction information extracting circuit 552a and an abnormality information extracting circuit 553a. The correction information extracting circuit 552a is different from the correction information extracting circuit 552 in that the output signal of a CAL 5522 is also outputted to the abnormality information extracting circuit 553a as well as an LPF 5523. The abnormality information extracting circuit 553a includes a SUB 5535, a detector circuit 5536, and an LPF 5537 downstream of a DCMT 5531 and a CAL 5532. The SUB 5535 subtracts the output signal of the CAL 5522 from the output signal of the CAL 5532 and then outputs the subtraction result. For example, the SUB 5535 subtracts the signal containing a temperature mean value in FIG. 7, from the signal containing a temperature mean value and a temperature difference value in FIG. B. The detector circuit 5536 detects the output signal of the SUB 5535 with the clock of a frequency FCLK and then outputs the signal. The LPF 5537 removes noise from the output signal of the detector circuit 5536, extracts a temperature difference value, and then outputs the difference value. The SUB 5535, the detector circuit 5536, and the LPF 5537 are examples of a difference calculating circuit. FIG. 14 shows an example of temperature difference data detected according to the second embodiment.

In the first embodiment, output data containing a temperature mean value and a temperature difference value in the CAL 5532 is removed in the BPF 5533 downstream of the CAL 5532 and then a maximum value and a minimum value are extracted in the temperature difference extracting circuit 5534 from the BPF output signal of the frequency FCLK so as to calculate the temperature difference data. In the second embodiment, the output signal of the CAL 5522 is subtracted from the output signal of the CAL 5532 so as to obtain a signal containing only temperature difference information, the temperature difference data is DC converted by detection with the clock of the frequency FCLK in the detector circuit 5536, and then noise is removed by the LPF 5537 downstream of the detector circuit 5536, allowing LPF output data to serve as the temperature difference data.

Thus, the second embodiment can obtain the same effect as the first embodiment.

Other Embodiments

In the foregoing embodiments, the internal sensors are two temperature sensors. Three or more temperature sensors may be provided in the present embodiment. In this case, for example, the output signals of the temperature sensors are converted in different frequency bands and at least the output signals are compared with each other so as to detect an abnormality of one of the temperature sensors.

The external sensors of the present embodiment are not limited to the angular velocity sensor 31 and the acceleration sensor S2. The external sensors of the present embodiment may be one of the angular velocity sensor S1 and the acceleration sensor S2 or other sensors.

The electronic control system according to the present embodiment detects a sideslip and controls an air bag. The contents of control are not limited. Moreover, the electronic control system and the semiconductor device according to the present embodiment may not be mounted in automobiles.

The invention made by the inventors was specifically described according to the embodiments. The present invention is not limited to the embodiments and thus is obviously changeable in various ways within the scope of the invention.

For example, in the semiconductor devices of the foregoing embodiments, the conductivity types (p-type or n-type) of a semiconductor substrate, a semiconductor layer, a diffusion layer (diffusion region), and so on may be reversed. Thus, if one of n-type and p-type is a first conductivity type and the other conductivity type is a second conductivity type, the first conductivity type may be p-type and the second conductivity type may be n-type. Conversely, the first conductivity type may be n-type and the second conductivity type may be p-type.

What is claimed is:

1. A semiconductor device comprising:
a plurality of temperature sensors that output a plurality of detection signals corresponding to a temperature of the semiconductor device;
a switching circuit that switches between outputting each of the detection signals from the temperature sensors at a predetermined frequency;
an analog-to-digital converter (ADC) which receives an output of the switching circuit and outputs a converted signal;
a correction information extracting circuit that extracts a first frequency component from the converted signal and outputs a temperature mean value of the detection signals corresponding to the first frequency component; and
an abnormality information extracting circuit that extracts a second frequency component from the converted signal and outputs a temperature difference value of the detection signals corresponding to the second frequency component.

2. The semiconductor device according to claim 1,
wherein the correction information extracting circuit attenuates the second frequency component from the converted signal and extracts the first frequency component from the converted signal, and
wherein the abnormality information extracting circuit removes the first frequency component from the converted signal and extracts the second frequency component from the converted signal.

3. The semiconductor device according to claim 2,
wherein the correction information extracting circuit includes:
a first decimation filter that attenuates the second frequency component at the predetermined frequency from the converted signal, and
a low-pass filter that removes noise from an output signal of the first decimation filter.

4. The semiconductor device according to claim 2,
wherein the abnormality information extracting circuit includes:
a second decimation filter that attenuates a third frequency component, which is at least twice as high as the predetermined frequency, from the converted signal;
a band-pass filter that removes noise and the first frequency component from an output signal of the second decimation filter, and
a difference calculating circuit that calculates the temperature difference value between the detection signals of the temperature sensors from an output signal of the band-pass filter.

5. The semiconductor device according to claim 1,
wherein the semiconductor device is coupled to an external sensor, and
the external sensor is an angular velocity sensor or an acceleration sensor in an electronic control unit including the semiconductor device, and
the electronic control unit corrects temperature characteristics of the external sensor based on the temperature mean value.

6. The semiconductor device according to claim 1, wherein the ADC is a delta sigma ADC.

7. An electronic control system comprising an external sensor and a semiconductor device,
the semiconductor device including:
a plurality of temperature sensors that output a plurality of detection signals corresponding to a temperature of the semiconductor device;
a switching circuit that switches between outputting each of the detection signals from the temperature sensors at a predetermined frequency;
an analog-to-digital converter (ADC) which receives an output of the switching circuit and outputs a converted signal;
a correction information extracting circuit that extracts a first frequency component from the converted signal and outputs a temperature mean value of the detection signals corresponding to the first frequency component; and
an abnormality information extracting circuit that extracts a second frequency component from the converted signal and outputs a temperature difference value of the detection signals corresponding to the second frequency component.

8. The electronic control system according to claim 7,
wherein the correction information extracting circuit attenuates the second frequency component from the converted signal and extracts the first frequency component, and
the abnormality information extracting circuit removes the first frequency component from the converted signal and extracts the second frequency component from the converted signal.

9. The electronic control system according to claim 8,
wherein the correction information extracting circuit includes:
a first decimation filter that attenuates the second frequency component at the predetermined frequency from the converted signal, and
a low-pass filter that removes noise from an output signal of the first decimation filter.

10. The electronic control system according to claim 8,
wherein the abnormality information extracting circuit includes:
a second decimation filter that attenuates a third frequency component, which is at least twice as high as the predetermined frequency, from the converted signal;
a band-pass filter that removes noise and the first frequency component from an output signal of the second decimation filter, and
a difference calculating circuit that calculates the temperature difference value between the detection signals of the temperature sensors from an output signal of the band-pass filter.

11. The electronic control system according to claim 7, wherein the ADC is a delta sigma ADC.

12. The electronic control system according to claim 7,
wherein the external sensor includes at least an angular velocity sensor that detects an angular velocity of an automobile having the electronic control system or an acceleration sensor that detects an acceleration of the automobile.

13. The electronic control system according to claim 7,
wherein the semiconductor device further includes:
a correcting circuit that corrects the output signal of the external sensor using the temperature mean value, and
an abnormality detecting circuit that detects an abnormality of the temperature sensors using the temperature difference value.

14. The electronic control system according to claim 13,
wherein the abnormality detecting circuit detects abnormalities of the temperature sensors when the temperature difference value exceeds a predetermined value.

15. The electronic control system according to claim 13, further comprising:
a processor that performs a predetermined operation according to an output of the correcting circuit or an output of the abnormality detecting circuit.

16. An automobile comprising:
an electronic control system including an external sensor and a semiconductor device separate from the external sensor,
wherein the semiconductor device includes:
a plurality of temperature sensors that output a plurality of detection signals corresponding to a temperature of the semiconductor device;
a switching circuit that switches between outputting each of the detection signals from the temperature sensors at a predetermined frequency;
a delta sigma analog-to-digital converter (ADC) which receives an output of the switching circuit and outputs a converted signal;

a correction information extracting circuit that extracts a first frequency component from the converted signal based on an output of the switching circuit, and outputs a temperature mean value of the detection signals corresponding to the first frequency component;

an abnormality information extracting circuit that extracts a second frequency component from the converted signal and outputs a temperature difference value of the detection signals corresponding to the second frequency component.

17. The automobile according to claim 16,
wherein the electronic control system is configured to correct an output signal of the external sensor using the temperature mean value.

18. The automobile according to claim 16,
wherein the electronic control system is configured to detect an abnormality of the temperature sensors using the temperature difference value.

* * * * *